(12) United States Patent  
Chen

(10) Patent No.: US 7,164,245 B1
(45) Date of Patent: Jan. 16, 2007

(54) BRUSHLESS MOTOR DRIVE DEVICE

(75) Inventor: Chi-Yang Chen, Hsinchu County (TW)

(73) Assignee: Aimtron Technology Corp., Hsinchu (TW)

( * ) Notice: Subject to any disclaimer, the term of this patent is extended or adjusted under 35 U.S.C. 154(b) by 0 days.

(21) Appl. No.: 11/307,104

(22) Filed: Jan. 24, 2006

(51) Int. Cl.
*H02P 5/06* (2006.01)

(52) U.S. Cl. .................. 318/254; 318/138; 318/439; 318/721

(58) Field of Classification Search ................ 318/138, 318/245, 254, 439, 721, 727, 719
See application file for complete search history.

(56) References Cited

U.S. PATENT DOCUMENTS

| | | | |
|---|---|---|---|
| 3,585,517 A | 6/1971 | Herbert | |
| 5,811,949 A | 9/1998 | Garces | |
| 6,674,258 B1* | 1/2004 | Sakai et al. | ................. 318/439 |
| 6,710,568 B1 | 3/2004 | Fujii | |
| 6,710,572 B1 | 3/2004 | Okubo | |
| 6,759,827 B1* | 7/2004 | Kawashima | ................. 318/727 |
| 6,924,611 B1 | 8/2005 | Tzeng et al. | |
| 6,933,690 B1 | 8/2005 | Yamamoto | |
| 7,015,663 B1* | 3/2006 | Tzeng et al. | ................. 318/254 |
| 2006/0049785 A1* | 3/2006 | Tzeng et al. | ................. 318/254 |

* cited by examiner

*Primary Examiner*—Paul Ip
(74) *Attorney, Agent, or Firm*—Winston Hsu

(57) ABSTRACT

A brushless motor drive device has a signal synthesizing circuit for converting a plurality of sensing signals into a plurality of drive signals so as to determine an amplitude of each of the drive signals in accordance with a current error signal. The sensing signals are generated by a sensing circuit in response to variations in a magnetic field of a brushless multi-phase motor. The current error signal is representative of a difference between a current command signal and a motor drive current. The signal synthesizing circuit is characterized by including a calibrating circuit for adjusting the current error signal in accordance with an amplitude of any of the sensing signals. The calibrating circuit includes a differential amplifying circuit, a rectifying circuit, a filtering circuit, and a dividing circuit.

15 Claims, 5 Drawing Sheets

BRUSHLESS MOTOR DRIVE DEVICE

BACKGROUND OF THE INVENTION

1. Field of the Invention

The present invention relates to a motor drive device and, more particularly, to a motor drive device for a brushless multi-phase DC motor.

2. Description of the Related Art

FIG. 1(a) is a circuit block diagram showing a conventional brushless motor drive device. Referring to FIG. 1(a), a motor M is a three-phase DC brushless motor having three phase coils U, V, and W. Three Hall sensing elements 11u, 11v, and 11w are arranged around the motor M for generating three Hall sensing signals HU, HV, and HW in response to variations in the magnetic field of the motor M. Based on the Hall sensing signals HU, HV, and HW, a signal synthesizing circuit 12 generates three sinusoidal drive signals SU, SV, and SW. Subsequently, the sinusoidal drive signals SU, SV, and SW are input to a pulse width modulation (PWM) comparing circuit 13 for being individually compared with respect to a high-frequency triangular reference signal T generated by an oscillating circuit 14. Based on the comparison of the sinusoidal drive signals SU, SV, and SW individually with the high-frequency triangular reference signal T, the PWM comparing circuit 13 generates three pulse signals PU, PV, and PW to be supplied to three pre-drivers N1, N2, and N3, respectively.

FIG. 1(b) is a waveform diagram showing an operation of a conventional brushless motor drive device. For the sake of simplicity, only is illustrated in FIG. 1(b) the operational waveforms associated with the coil U of the motor M since each of the phase coils U, V, and W of the motor M is operated with similar waveforms. Referring to FIG. 1(b), the pulse signal PU is generated from the comparison of the sinusoidal drive signal SU and the high-frequency triangular reference signal T through using the PWM comparing circuit 13. More specifically, the HIGH level of the pulse signal PU corresponds to an interval of time when the sinusoidal drive signal SU goes higher than the high-frequency triangular reference signal T and the LOW level of the pulse signal PU corresponds to an interval of time when the sinusoidal drive signal SU goes lower than the high-frequency triangular reference signal T. In response to the pulse signal PU, the pre-driver N1 generates the switching signals UH and UL for controlling the switches S1 and S2, respectively.

A three-phase switching circuit 15 has a pair of switches S1 and S2, a pair of switches S3 and S4, and a pair of switches S5 and S6, each pair being controlled by one corresponding pair of the switching signals UH and UL, VH and VL, and WH and WL. A motor drive current $I_m$ is allowed to flow from a drive voltage source $V_{dd}$ to the coil U when the switch S1 becomes short-circuited and to flow from the coil U to a ground potential when the switch S2 becomes short-circuited. The motor drive current $I_m$ is allowed to flow from the drive voltage source $V_{dd}$ to the coil V when the switch S3 becomes short-circuited and to flow from the coil V to the ground potential when the switch S4 becomes short-circuited. The motor drive current $I_m$ is allowed to flow from the drive voltage source $V_{dd}$ to the coil W when the switch S5 becomes short-circuited and to flow from the coil W to the ground potential when the switch S6 becomes short-circuited.

For detecting the motor drive current $I_m$, a resistor $R_s$ is series-connected between the common connecting point of the switches S2, S4, and S6 and the ground potential. A voltage difference caused by the motor drive current $I_m$ flowing through the resistor $R_s$ is supplied as a negative feedback to an inverting input terminal of an error amplifier EA. The error amplifier EA compares the voltage difference representative of the motor drive current $I_m$ with a current command signal $I_{com}$ for generating a current error signal $I_{err}$. Subsequently, the signal synthesizing circuit 12 adjusts the amplitudes of the sinusoidal drive signals SU, SV, and SW in accordance with the current error signal $I_{err}$.

FIG. 1(c) is a circuit block diagram showing a conventional signal synthesizing circuit 12. Referring to FIG. 1(c), the signal synthesizing circuit 12 has a position detecting circuit 20, a phase shifting circuit 21, and three multiplying circuits 22u, 22v, and 22w. On the basis of the Hall sensing signals HU, HV, and HW, the position detecting circuit 20 determines positions of a rotor (not shown) in the motor M and then generates three position signals 23u, 23v, and 23w. The phase shifting circuit 21 makes the phase of each of the position signals 23u, 23v, and 23w shifted by 30 degrees so as to form three sinusoidal control signals 24u, 24v, and 24w, respectively. Finally, through the multiplying circuits 22u, 22v, and 22w, the sinusoidal control signals 24u, 24v, and 24w are multiplied by the current error signal $I_{err}$ so as to become the sinusoidal drive signals SU, SV, and SW. Therefore, the amplitudes of the sinusoidal drive signals SU, SV, and SW are effectively adjusted in accordance with the current error signal $I_{err}$.

However, in the conventional signal synthesizing circuit 12, the amplitudes of the sinusoidal drive signals SU, SV, and SW are also subjected to the influence of the Hall sensing signals HU, HV, and HW. More specifically, during the procedure where the position detecting circuit 20 together with the phase shifting circuit 21 generate the sinusoidal control signals 24u, 24v, and 24w on the basis of the Hall sensing signals HU, HV, and HW, the amplitudes of the Hall sensing signals HU, HV, and HW are preserved and passing on, such that each of the sinusoidal control signals 24u, 24v, and 24w has an amplitude in proportion to the amplitude of the corresponding one of the Hall sensing signals HU, HV, and HW. Typically, the Hall sensing signals HU, HV, and HW generated from the Hall sensing elements 11u, 11v, and 11w have amplitudes that are influenced by the size and parameters of the Hall sensing elements and the surrounding temperature during operation. As a consequence, the amplitudes of the sinusoidal control signals 24u, 24v, and 24w are changed along with the variations of the amplitudes of the Hall sensing signals HU, HV, and HW, even if the current error signal $I_{err}$ remains constant. Since the amplitudes of the sinusoidal drive signals SU, SV, and SW have effects on determining the duty ratios of the pulse signals PU, PV, and PW generated from the PWM comparing circuit 13, the conventional signal synthesizing circuit 12 renders the operation of the motor M subjected to the variations of the Hall sensing signals HU, HV, and HW, which is a disadvantage with respect to motor's stability of rotation.

SUMMARY OF THE INVENTION

In view of the above-mentioned problems, an object of the present invention is to provide a brushless motor drive device capable of effectively preventing the sinusoidal drive signals from the influence caused by the variations of the amplitudes of the Hall sensing signals.

According to one aspect of the present invention, a brushless motor drive device is provided for driving a multi-phase motor, including a current sensing circuit, an error determining circuit, a sensing circuit, a signal synthesizing circuit, a comparing circuit, and a switching circuit. The current detecting circuit generates a current detection signal representative of a motor drive current flowing through the multi-phase motor. The error determining circuit generates a current error signal representative of a difference between a current command signal and the current detection signal. In response to variations in a magnetic field of the multi-phase motor, the sensing circuit generates a plurality of sensing signals. The signal synthesizing circuit converts the plurality of sensing signals into a plurality of drive signals, such that an amplitude of each of the drive signals is determined in accordance with the current error signal. Based on the comparison between the plurality of drive signals and a reference signal, the comparing circuit generates a plurality of pulse signals. The switching circuit is coupled between a drive voltage source and the multi-phase motor and controlled by the plurality of pulse signals for driving the multi-phase motor. The brushless motor drive device is characterized in that the signal synthesizing circuit includes a calibrating circuit for adjusting the current error signal in accordance with an amplitude of any of the sensing signals.

The calibrating circuit includes a differential amplifying circuit, a rectifying circuit, a filtering circuit, and a dividing circuit. The differential amplifying circuit subtracts the negative signal from the positive signal of any of the sensing signals so as to output a sinusoidal signal. The rectifying circuit converts the sinusoidal signal into a single-polarity signal. The filtering circuit retrieves from the single-polarity signal a calibration factor representative of an amplitude of the single-polarity signal. The dividing circuit adjusts the current error signal through dividing the current error signal by the calibration factor.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 1A:
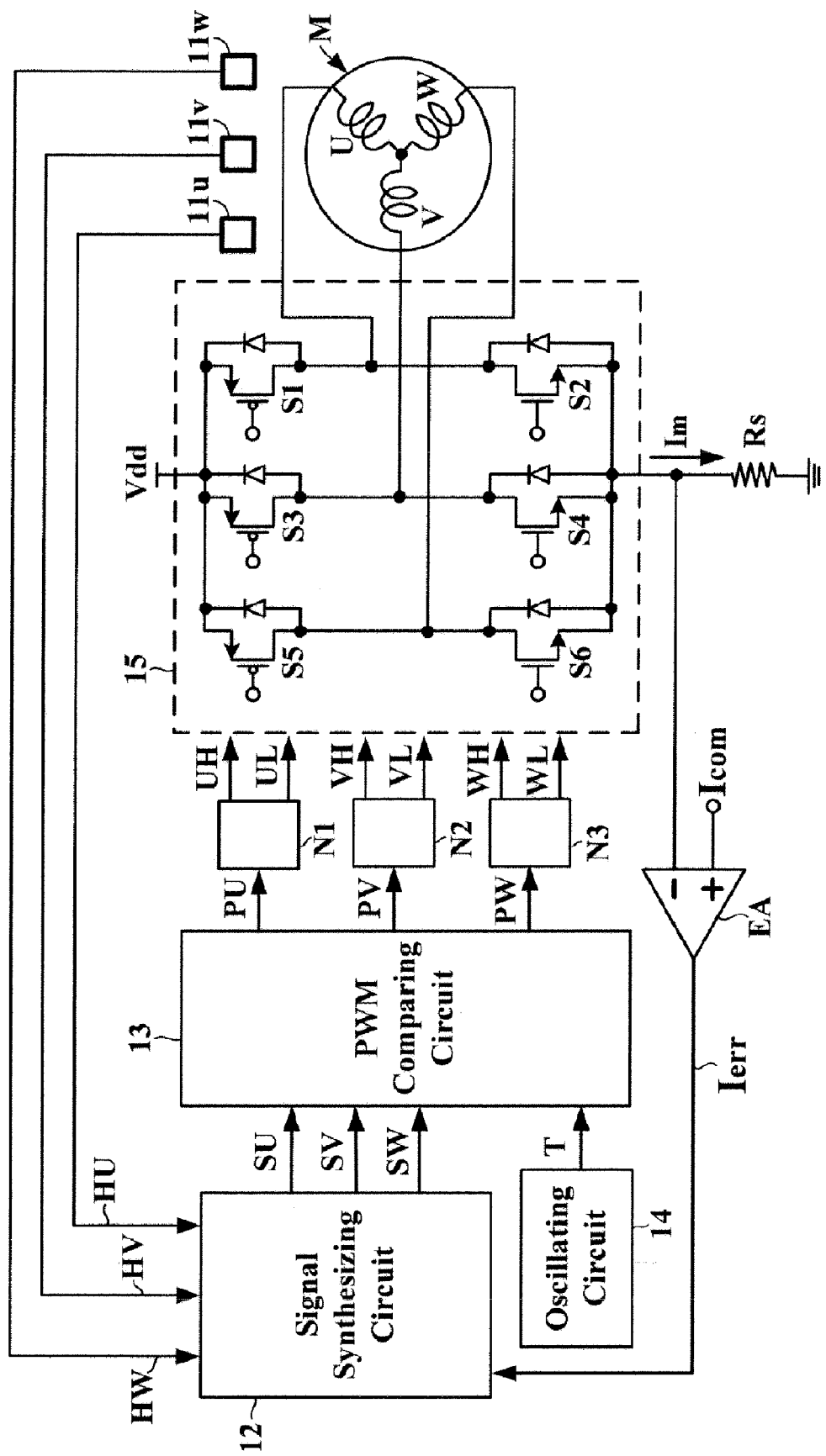
FIG. 1(a) is a circuit block diagram showing a conventional brushless motor drive device.
Figure 1B:
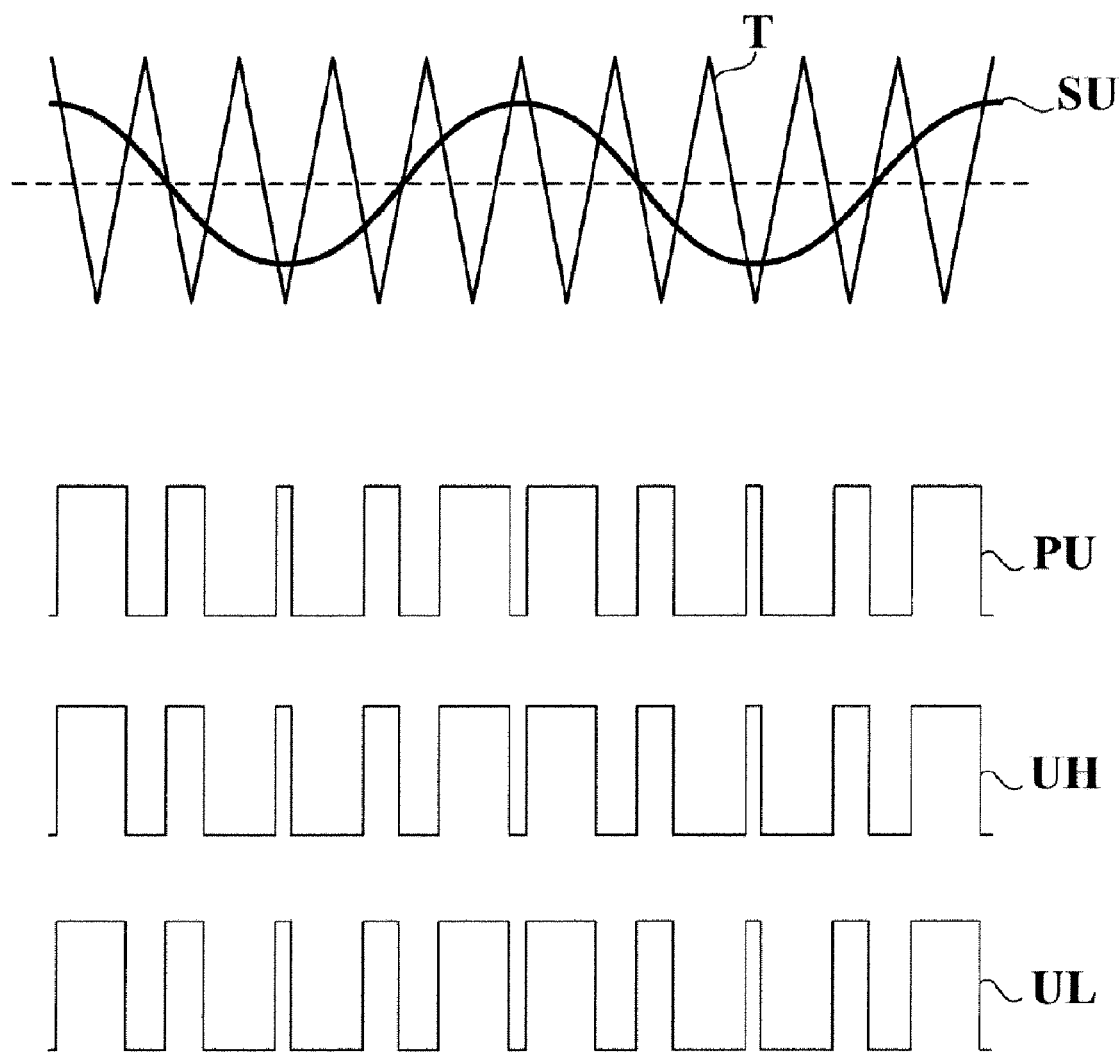
FIG. 1(b) is a waveform diagram showing an operation of a conventional brushless motor drive device.
Figure 1C:
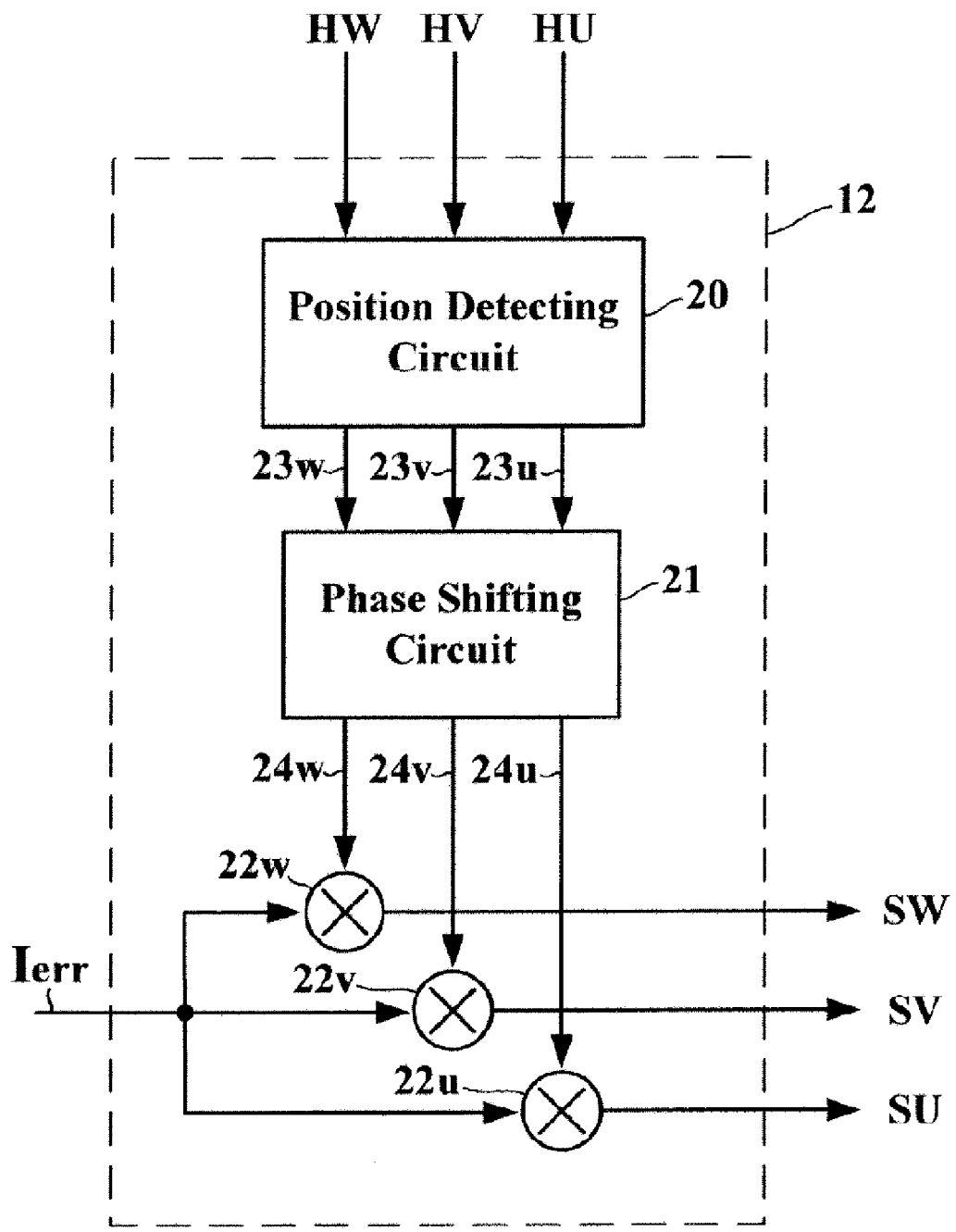
FIG. 1(c) is a circuit block diagram showing a conventional signal synthesizing circuit.
Figure 2:
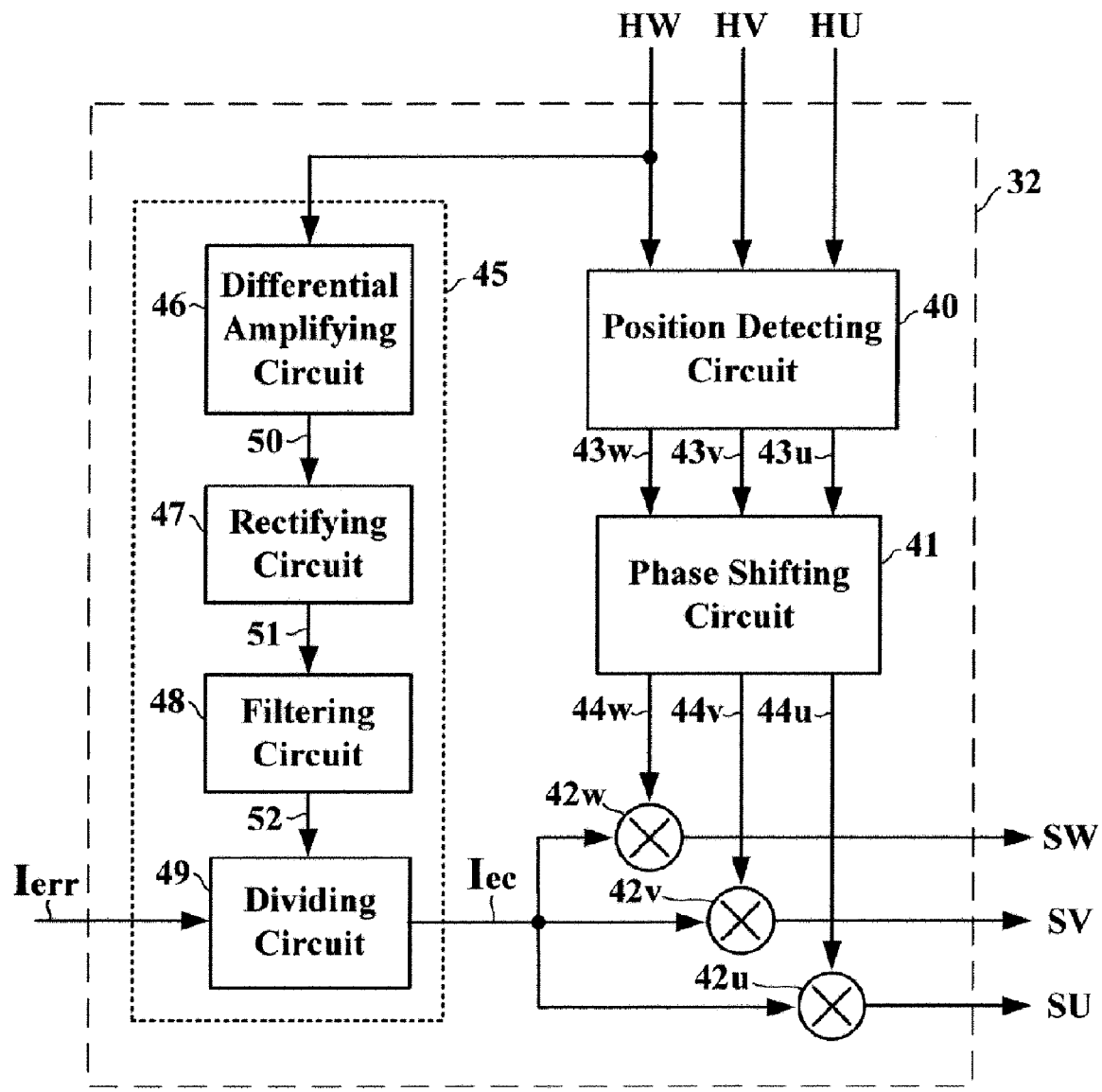
FIG. 2 is a circuit block diagram showing a signal synthesizing circuit according to the present invention.

FIG. 2 is a circuit block diagram showing a signal synthesizing circuit 32 according to the present invention. The signal synthesizing circuit 32 is applied in the brushless motor drive device shown in FIG. 1(a), for replacing the conventional signal synthesizing circuit 12. As already described with reference to FIG. 1(a), the motor M is a three-phase DC brushless motor having three phase coils U, V, and W. The three Hall sensing elements 11u, 11v, and 11w, which together make up a sensing circuit, are arranged around the motor M for generating three Hall sensing signals HU, HV, and HW in response to variations in the magnetic field of the motor M. Based on the Hall sensing signals HU, HV, and HW, the signal synthesizing circuit 32 according to the present invention generates three sinusoidal drive signals SU, SV, and SW. Subsequently, the sinusoidal drive signals SU, SV, and SW are input to the PWM comparing circuit 13 for being individually compared with respect to a high-frequency triangular reference signal T generated by an oscillating circuit 14. Based on the comparison of the sinusoidal drive signals SU, SV, and SW individually with the high-frequency triangular reference signal T, the PWM comparing circuit 13 generates three pulse signals PU, PV, and PW to be supplied to three pre-drivers N1, N2, and N3. In response to the pulse signal PU, the pre-driver N1 generates a pair of switching signals UH and UL. In response to the pulse signal PV, the pre-driver N2 generates a pair of switching signals VH and VL. In response to the pulse signal PW, the pre-driver N3 generates a pair of switching signals WH and WL For detecting the motor drive current $I_m$, a resistor $R_s$ is used as a current detecting circuit, which is series-connected between the common connecting point of the switches S2, S4, and S6 and the ground potential. A voltage difference caused by the motor drive current $I_m$ flowing through the resistor $R_s$ is retrieved as a current detection signal representative of the motor drive current $I_m$. An error determining circuit is implemented by an error amplifier EA. The error amplifier EA has a non-inverting input terminal for receiving a current command signal $I_{com}$ and an inverting input terminal for receiving the current detection signal representative of the motor drive current $I_m$. Based on a difference between the current command signal $I_{com}$ and the motor drive current $I_m$, the error amplifier EA generates a current error signal $I_{err}$ at its output terminal. Subsequently, the signal synthesizing circuit 32 according to the present invention adjusts the amplitudes of the sinusoidal drive signals SU, SV, and SW in accordance with the current error signal $I_{err}$.

Referring to FIG. 2, the signal synthesizing circuit 32 has a position detecting circuit 40, a phase shifting circuit 41, three multiplying circuits 42u, 42v, and 42w, and a calibrating circuit 45. On the basis of the Hall sensing signals HU, HV, and HW, the position detecting circuit 40 determines the positions of the rotor (not shown) in the motor M and then generates three position signals 43u, 43v, and 43w. Therefore, the position signals 43u, 43v, and 43w indicate the positional relationship between the rotor of the motor M and the three phase coils U, V, and W. More specifically, each of the position signals 43u, 43v, and 43w is a sinusoidal signal synchronous with the rotation of the motor M and is 120 degrees out of phase with respect to each other. Afterward, the phase shifting circuit 41 makes each of the position signals 43u, 43v, and 43w shifted by 30 degrees in phase so as to form three sinusoidal control signals 44u, 44v, and 44w, respectively.

On the other hand, any of the Hall sensing signals HU, HV, and HW, such as the signal HW associated with the coil W, is further supplied to the calibrating circuit 45. The calibrating circuit 45 at first calculates a calibration factor, which is in proportion to the amplitude of the Hall sensing signal HW, and then divides the current error signal $I_{err}$ by the calibration factor so as to generate a calibrated current error signal $I_{ec}$. It should be noted that it is enough for the calibrating circuit 45 to calculate the calibration factor on the basis of only one of the Hall sensing signals HU, HV, and HW because each of them has the same amplitude. Therefore, the calibrating circuit 45 effectively converts the original current error signal $I_{err}$ into the calibrated current error signal $I_{ec}$, such that the calibrated current error signal $I_{ec}$ is equal to the original current error signal $I_{err}$ divided by the calibration factor.

Finally, through the multiplying circuits 42u, 42v, and 42w, each of the sinusoidal control signals 44u, 44v, and 44w are multiplied by the calibrated current error signal $I_{ec}$ so as to form sinusoidal drive signals SU, SV, and SW. As a result of such multiplication, the calibration factor existing in the calibrated current error signal $I_{ec}$ effectively cancels out the amplitude factor, which is attributive to the Hall sensing signal, of the sinusoidal control signals 44u, 44v, and 44w since the calibration factor is in proportion to the amplitude of the Hall sensing signal. In other words, the sinusoidal drive signals SU, SV, and SW generated from the multiplying circuits 42u, 42v, and 42w are completely free from the variations of the amplitudes of the Hall sensing signals HU, HV, and HW. Therefore, the signal synthesizing circuit 32 according to the present invention effectively prevents the sinusoidal drive signals SU, SV, and SW from the influence caused by the variations of the amplitudes of the Hall sensing signals HU, HV, and HW.

Figure 3A:
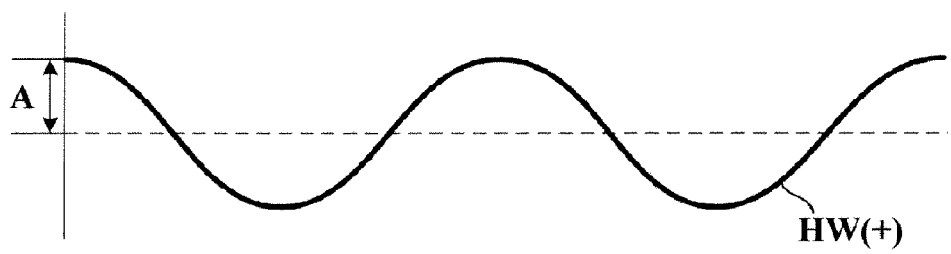
FIG. 3(a) is a waveform diagram showing a positive signal of a Hall sensing signal.
Figure 3B:
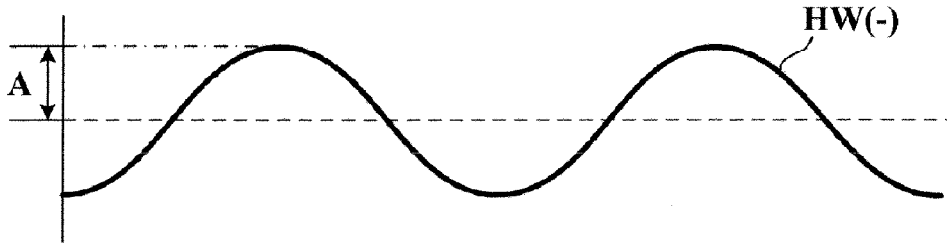
FIG. 3(b) is a waveform diagram showing a negative signal of a Hall sensing signal.
Figure 3C:
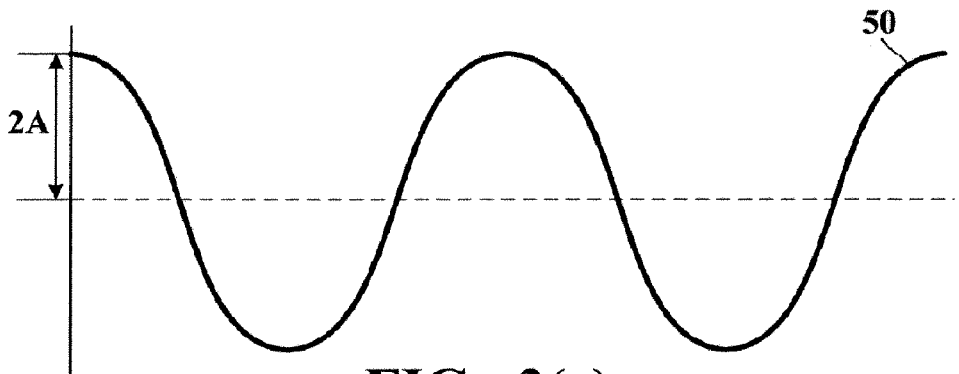
FIG. 3(c) is a waveform diagram showing a sinusoidal signal output from a differential amplifying circuit.
Figure 3D:
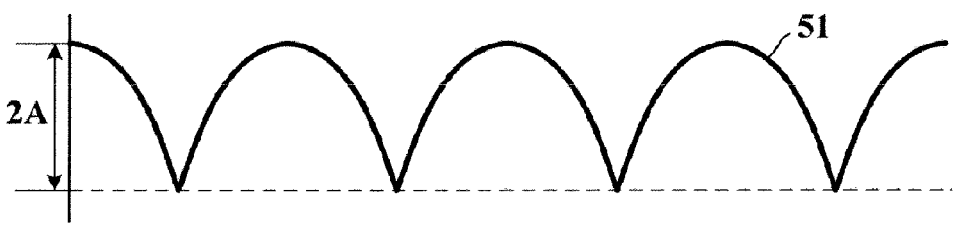
FIG. 3(d) is a waveform diagram showing a single-polarity signal output from a rectifying circuit.

More specifically, the calibrating circuit 45 has a differential amplifying circuit 46, a rectifying circuit 47, a low-frequency filtering circuit 48, and a dividing circuit 49. Hereinafter is described in detail an operation of the calibrating circuit 45 according to the present invention with reference to FIGS. 3(a) to 3(d). Referring at first to FIGS. 3(a) and 3(b), the Hall sensing signal HW output from the Hall sensing element 11w actually has a pair of a positive signal $HW_{(+)}$ and a negative signal $HW_{(-)}$, both of which have sinusoidal components in an asymmetrical form with respect to each other. As shown in FIG. 3(a), the positive signal $HW_{(+)}$ has an amplitude of A. As shown in FIG. 3(b), the negative signal $HW_{(-)}$ has an amplitude of A. The differential amplifying circuit 46 subtracts the negative signal $HW_{(-)}$ from the positive signal $HW_{(+)}$ so as to generate a sinusoidal signal 50 having an amplitude of 2 A, as shown in FIG. 3(c). Subsequently, the rectifying circuit 47 converts the sinusoidal signal 50 into a single-polarity signal 51 as shown in FIG. 3(d). In one embodiment, the rectifying circuit 47 may be implemented by a conventional full-bridge rectifier whose circuitry configuration and operation are well-known by one skilled in the art and therefore any further detailed description is omitted.

The low-frequency filtering circuit 48 retrieves the low-frequency portion or the DC component of the single-polarity signal 51 for the generation of the calibration factor 52 to be supplied to the dividing circuit 49. As a result, the calibration factor 52 is a DC signal having an amplitude of 2 A, which is indeed in proportion to the amplitude of the Hall sensing signal HW. In one embodiment, the low-frequency filtering circuit 48 is implemented by a conventional low-frequency capacitive filter whose circuitry configuration and operation are well-known by one skilled in the art and therefore any further detailed description is omitted. Upon receiving the calibration factor 52 from the low-frequency filtering circuit 48, the dividing circuit 49 divides the original current error signal $I_{err}$ by the calibration factor 52 so as to form the calibrated current error signal $I_{ec}$. Afterward with the multiplying circuit 42w, the calibration factor 52 of the calibrated current error signal $I_{ec}$ effectively cancels out the amplitude factor, which is attributive to the Hall sensing signal HW, of the sinusoidal control signal 44w, such that the sinusoidal drive signal SW is free from the influence caused by the variations of the amplitude of the Hall sensing signal HW.

It should be noted that although the three-phase motor is used as an example in the foregoing description, the present invention is not limited to this and may be applied to a motor having more phases than three.

It should be noted that in the embodiment described above, for detecting the motor drive current $I_m$, the resistor $R_s$ serving as a current detecting circuit is series-connected between the common connecting point of the switches S2, S4, and S6 and the ground potential. However, in another embodiment, the resistor $R_s$ serving as a current detecting circuit may be series-connected between the common connecting point of the switches S1, S3, and S5 and the drive voltage source $V_{dd}$.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A brushless motor drive device for driving a multi-phase motor, comprising:
   a current detecting circuit for generating a current detection signal representative of a motor drive current flowing through the multi-phase motor;
   an error determining circuit for generating a current error signal representative of a difference between a current command signal and the current detection signal;
   a sensing circuit for generating a plurality of sensing signals in response to variations in a magnetic field of the multi-phase motor;
   a signal synthesizing circuit for converting the plurality of sensing signals into a plurality of drive signals, such that an amplitude of each of the drive signals is determined in accordance with the current error signal;
   a comparing circuit for comparing the plurality of drive signals with a reference signal so as to generate a plurality of pulse signals; and
   a switching circuit coupled between a drive voltage source and the multi-phase motor and controlled by the plurality of pulse signals for driving the multi-phase motor,
   characterized in that:
   the signal synthesizing circuit includes a calibrating circuit for adjusting the current error signal in accordance with an amplitude of any of the sensing signals.

2. The device according to claim 1, wherein:
   the sensing circuit is implemented by a plurality of Hall sensing elements for generating the plurality of sensing signals.

3. The device according to claim 1, wherein:
   each of the plurality of sensing signals has a positive signal and a negative signal.

4. The device according to claim 3, wherein:
   the calibrating circuit includes:
   a differential amplifying circuit for subtracting the negative signal from the positive signal of any of the sensing signals so as to output a sinusoidal signal;
   a rectifying circuit for converting the sinusoidal signal into a single-polarity signal;

a filtering circuit for retrieving from the single-polarity signal a calibration factor representative of an amplitude of the single-polarity signal; and a dividing circuit for adjusting the current error signal through dividing the current error signal by the calibration factor.

5. The device according to claim 1, wherein:

the signal synthesizing circuit further includes:

a position detecting circuit for generating a plurality of position signals based on the plurality of sensing signals, such that the position signals indicate positions of a rotor of the multi-phase motor;

a phase shifting circuit for shifting each of the position signals by a predetermined degree in phase; and a plurality of multiplying circuits for multiplying each of the shifted position signals with the current error signal so as to generate the plurality of drive signals.

6. The device according to claim 1, wherein:

the current detecting circuit is implemented by a resistor, coupled between the switching circuit and a ground potential, for allowing the motor drive current to flow through the resistor so as to generate a potential difference for serving as the current detection signal.

7. The device according to claim 1, wherein:

the error determining circuit is implemented by an error amplifier having a non-inverting input terminal for receiving the current command signal, an inverting input terminal for receiving the current detection signal, and an output terminal for providing the current error signal.

8. The device according to claim 1, wherein:

each of the plurality of drive signals is a sinusoidal signal.

9. The device according to claim 1, wherein:

the reference signal is a triangular signal.

10. The device according to claim 1, wherein:

the reference signal has a frequency higher than a frequency of each of the drive signals.

11. A brushless motor drive device for driving a multi-phase motor, comprising:

a sensing circuit for generating a plurality of sensing signals in response to variations in a magnetic field of the multi-phase motor;

a synthesizing circuit for converting the plurality of sensing signals into a plurality of drive signals, such that an amplitude of each of the drive signals is determined in accordance with a current error signal, the current error signal being representative of a difference between a current command signal and a motor drive current;

a comparing circuit for comparing the plurality of drive signals with a reference signal so as to generate a plurality of pulse signals; and a switching circuit coupled between a drive voltage source and the multi-phase motor and controlled by the plurality of pulse signals for driving the multi-phase motor, characterized in that:

the synthesizing circuit includes a calibrating circuit for adjusting the current error signal in accordance with an amplitude of any of the sensing signals.

12. The device according to claim 11, wherein:

the sensing circuit is implemented by a plurality of Hall sensing elements for generating the plurality of sensing signals.

13. The device according to claim 11, wherein:

each of the plurality of sensing signals has a positive signal and a negative signal.

14. The device according to claim 13, wherein:

the calibrating circuit includes:

a differential amplifying circuit for subtracting the negative signal from the positive signal of any of the sensing signals so as to output a sinusoidal signal;

a rectifying circuit for converting the sinusoidal signal into a single-polarity signal;

a filtering circuit for retrieving from the single-polarity signal a calibration factor representative of an amplitude of the single-polarity signal; and a dividing circuit for adjusting the current error signal through dividing the current error signal by the calibration factor.

15. The device according to claim 11, wherein:

the synthesizing circuit further includes:

a position detecting circuit for generating a plurality of position signals based on the plurality of sensing signals, such that the position signals indicate positions of a rotor of the multi-phase motor;

a phase shifting circuit for shifting each of the position signals by a predetermined degree in phase; and a plurality of multiplying circuits for multiplying each of the shifted position signals with the current error signal so as to generate the plurality of drive signals.

* * * * *